June 21, 1960  F. X. McCAFFERY  2,941,560
APPARATUS FOR CUTTING A FROZEN SLAB OF EDIBLE FLESH
Filed Sept. 14, 1954  4 Sheets-Sheet 1

INVENTOR
*Francis X. McCaffery.*
BY *Cameron, Kerkam & Sutton*
ATTORNEYS

June 21, 1960 F. X. McCAFFERY 2,941,560
APPARATUS FOR CUTTING A FROZEN SLAB OF EDIBLE FLESH
Filed Sept. 14, 1954 4 Sheets-Sheet 2
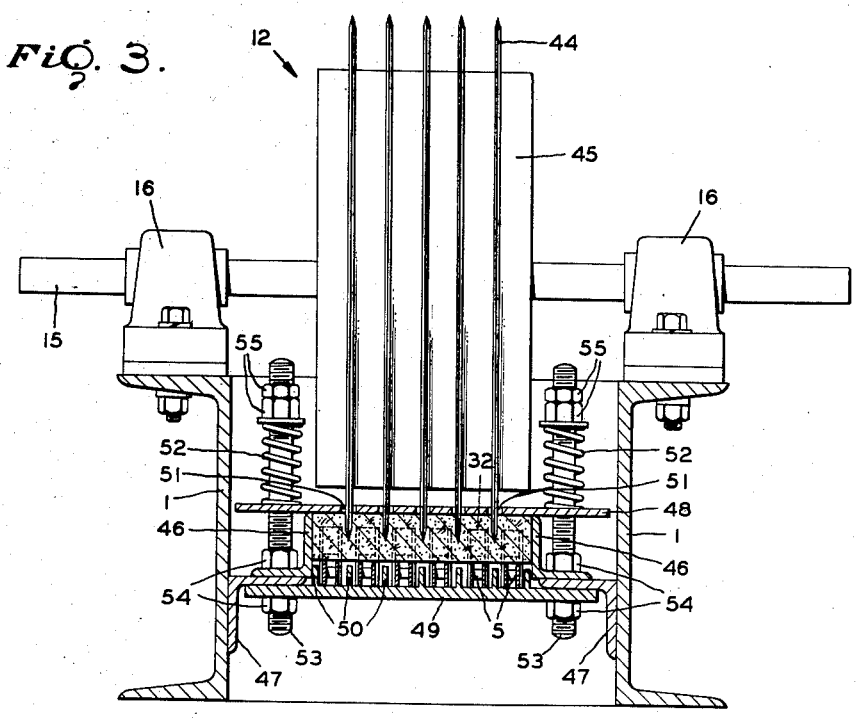
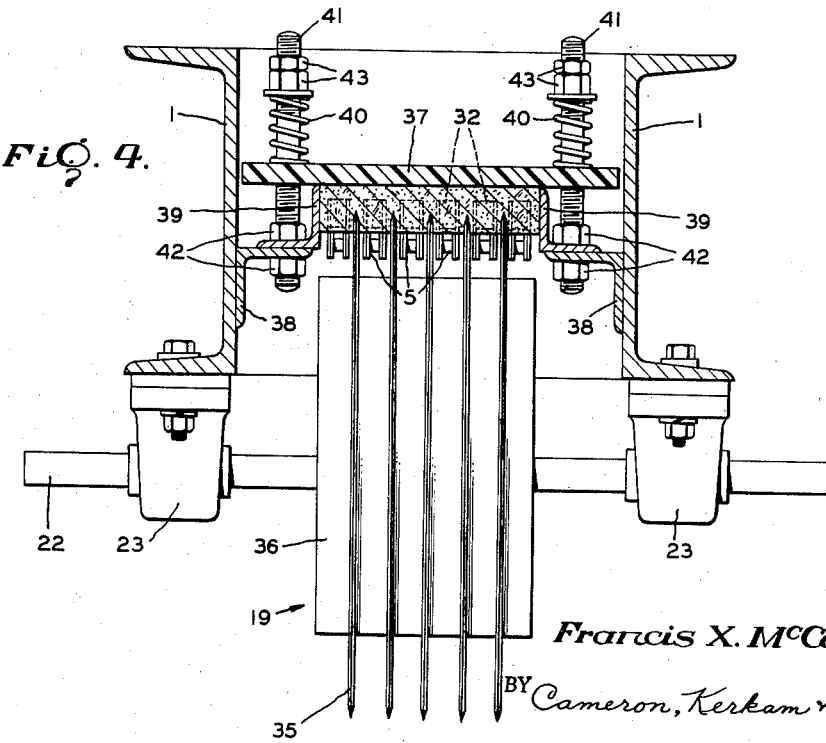
INVENTOR
Francis X. McCaffery.
BY Cameron, Kerkam & Sutton
ATTORNEYS June 21, 1960    F. X. McCAFFERY    2,941,560
APPARATUS FOR CUTTING A FROZEN SLAB OF EDIBLE FLESH
Filed Sept. 14, 1954    4 Sheets-Sheet 3
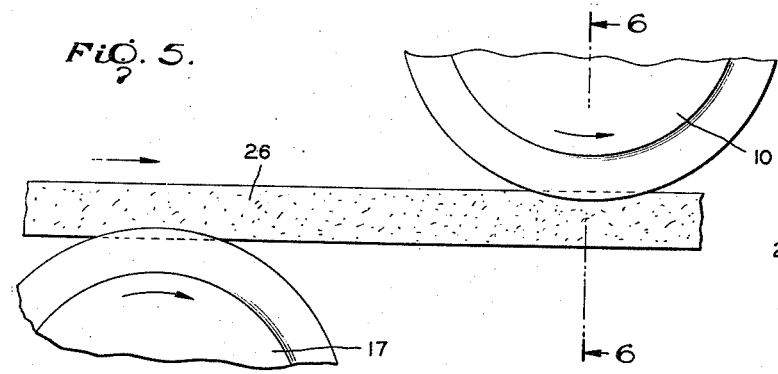
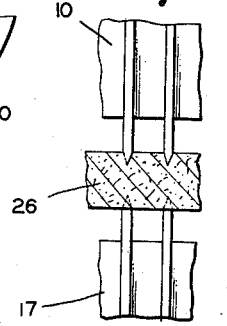
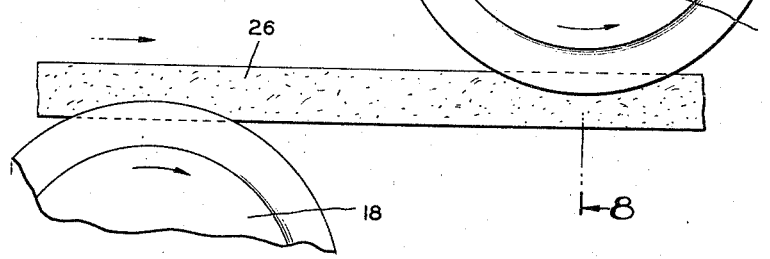
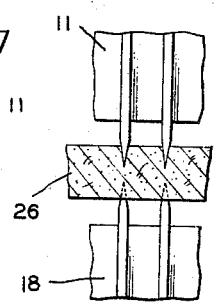
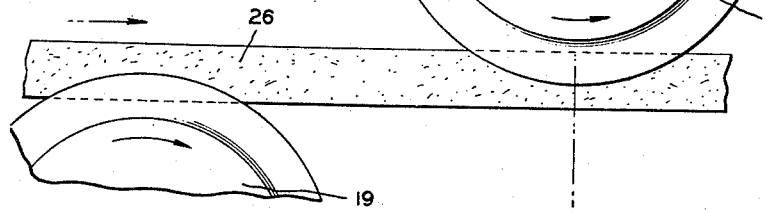
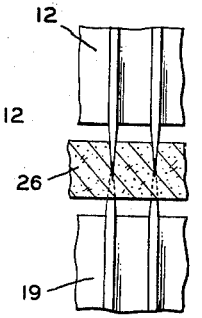
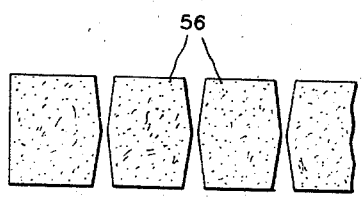
INVENTOR
Francis X. McCaffery.
BY
Cameron, Kerkam & Sutton
ATTORNEYS June 21, 1960 F. X. McCAFFERY 2,941,560
APPARATUS FOR CUTTING A FROZEN SLAB OF EDIBLE FLESH
Filed Sept. 14, 1954 4 Sheets-Sheet 4

INVENTOR
*Francis X. McCaffery.*
BY *Cameron, Kerkam & Sutton*
ATTORNEYS

United States Patent Office 2,941,560
Patented June 21, 1960

2,941,560

APPARATUS FOR CUTTING A FROZEN SLAB OF EDIBLE FLESH

Francis X. McCaffery, Gloucester, Mass., assignor to General Foods Corporation, White Plains, N.Y., a corporation of Delaware Filed Sept. 14, 1954, Ser. No. 455,861

6 Claims. (Cl. 146—78)

This invention relates to the production of elongated pieces of edible meat or flesh, roughly equivalent in size and shape to the ordinary frankfurter, from random-sized and shaped pieces of meat or if desired from comminuted bulk material and without the use of sausage casings or resort to expedients such as pressure molding, case hardening, etc.

The invention can be explained conveniently with reference to the so-called "fish stick," a product which has rapidly attained wide popularity within recent years, although it is equally well suited to the production of similar products from other kinds of meat, etc. Fish sticks can be made from large or small fillets, broken pieces of fillets, or from still smaller pieces and even from comminuted fish meat. In any case, the fish meat used is first formed into blocks or slabs of appropriate size and shape and frozen hard, and then sawed while still frozen into pieces or sticks usually about 3–4 inches long and in the neighborhood of ½–¾ inches in rectangular cross section. It is further desirable, at least in the case of fish, to coat or enrobe the sticks with batter, after which they are cooked and then refrozen for commercial storage and distribution. It is to be understood, however, that coating with batter or other material is not necessary in all cases.

It will be appreciated that such a slap of frozen fish meat or other flesh product comprises essentially a solid block of brittle ice, the meat tissues being a relatively small part of the whole and also relatively fragile. Such a slap canot easily be cut or sliced sharply and cleanly without breakage or wastage. The familiar means employed to cut various products into small pieces, i.e., a circular knife or knives rotating at relatively high speed in the neighborhood of 1000–3000 r.p.m. and equivalent high speed cutting or slicing devices, do not afford satisfactory results, and heretofore the use of rotating saws has been preferred despite an accompanying loss of edible meat in the form of sawdust that may amount to 10–11%.

A primary object of the present invention accordingly is to provide an improved method and apparatus whereby the loss heretofore incident to sawing such slabs into pieces is avoided.

Another object is to provide an improved method and apparatus whereby frozen blocks or slabs of the character indicated above can be cut into small pieces cleanly and sharply and without undue breakage or wastage by means of rotating circular knives or equivalent cutting or slicing devices.

Another object is to provide an improved method and means for separating and handling the individual sticks into which the slab is cut so as to facilitate the application of a coating thereto.

Other objects will appear hereinafter as the description proceeds.

In practicing the present invention, the desired edible flesh, such as meat and especially fish meat, is first formed into blocks or slabs of desired size and shape by any suitable known means and procedure, and then each slab is moved by suitable traveling mechanism through a cutting zone in which it is cut into sticks of the desired size and shape. It will be evident that if the dimensions of the frozen slab are properly chosen, sticks of the desired dimensions can be produced simply by making parallel cuts through the slab in the direction of its movement. For this operation we have found that cutting or slicing devices can be substituted for sawing devices with excellent results if the cuts are formed gradually by a series of progressively deeper, superimposed incisions made by cutting devices moving at very low speeds relative to the slab.

In a preferred embodiment, the slabs are placed one by one on a suitable conveyor and moved thereby under a series of gangs or sets of circular rotating knives, the knives of each successive set being arranged to deepen the cuts made by the knives of the preceding set. The desired low speed of the cutting edges relative to the slabs is most readily provided by rotating the knives so that their ctuting edges move in the same direction as the conveyor but at a somewhat greater linear speed, say 1–10 times the speed of the slab itself. Provided the slabs are restrained against acceleration relative to the conveyor, the speed of the cutting edges relative to and in contact with the slab is equal to the differential between the linear speeds of the cutting edges and the conveyor (or slab).

Thus the cuts in the slabs are progessively deepened as the slabs move through the cutting zone. Preferably the first cutting blades have short bevels and make cuts that are shallow and relatively wide in proportion to their depth. By progressively increasing the radial extent of the bevels on the cutting edges of the successive knives or blades, this gradual deepening of the incisions takes place without any undue pressure or wear on the sides of the cut that would exist if the first blade or an equivalent bevel were forced into the interior of the slab. Of course, there is a practical limitation on the depth of incision that can be reached with such progressively increasing bevels, especially with thin blades. But this difficulty can be avoided in most cases by providing both upper and lower gangs of knives or blades making aligned top and bottom incisions in the slab, thus in effect dividing the required depth of incision in half. This arrangement also has the advantage of shortening the overall length of the cutting zone and conveyor, although on the other hand the conveyor must be subdivided into a plurality of side-by-side sections between which the lower blades may rotate into engagement with the slab.

In case coating or enrobing of the sticks is desired, the present process further contemplates retarding the group or row of sticks relative to the conveyor at a point adjacent the end of the cutting zone while advancing an individual stick or a plurality of non-adjacent sticks ahead of the group to the coating zone or station. As the conveyor continues to move ahead relative to the retarded group of sticks, pusher elements carried by the conveyor engage the rear ends of selected sticks and advance them relative to the retarded group, each pusher having a restricted width so that it can pass between the sticks on either side of the one to be advanced. Evidently the sticks can be advanced one by one, or in groups comprising every other stick, every third stick, etc., as may be desired. The separation of the sticks in this manner facilitates the application of the desired coating which otherwise could not be applied entirely around each stick without great difficulty.

In the preferred embodiment in which both upper and lower cutters are employed with a subdivided conveyor, the retardation of the group of sticks is advantageously accomplished by dividers passing between each two adjacent sticks in a direction opposite to the movement of the conveyor so as to slow down and preferably to stop the advance of the group of sticks. These dividers also act as separator elements to insure that the separation of the sticks from one another is complete and to prevent adherence between the stick that is to be advanced and an adjacent stick which might arise by reason of union at points of frozen contact therebetween. Preferably, therefore, the separator elements comprise circular disks or blades rotating in a direction opposite to that of the preceding cutter blades.

The accompanying drawings show by way of example a preferred embodiment of apparatus for practicing the method set forth above, but it is to be expressly understood that this embodiment is by way of example only and that said drawings are not to be construed as a definition of the limits of the invention, reference being had to the appended claims for this purpose.

Figure 1:
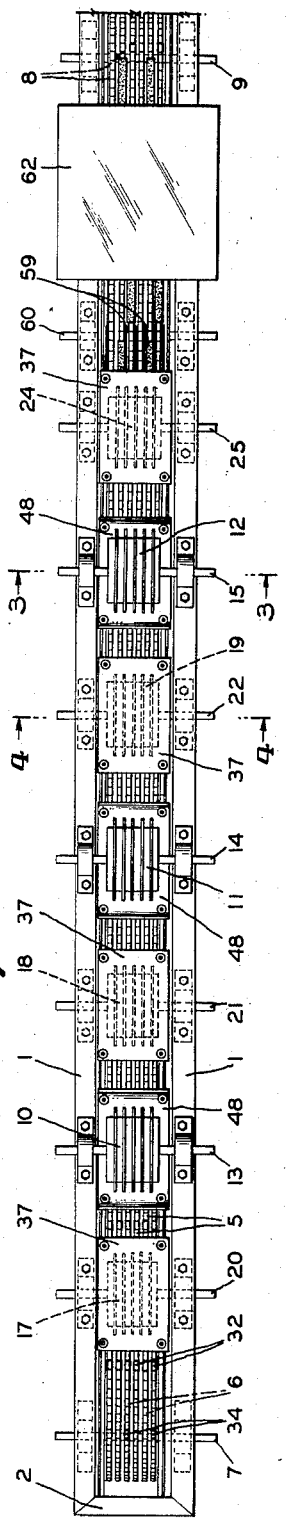
Fig. 1 is a plan view of the apparatus.
Figure 12:
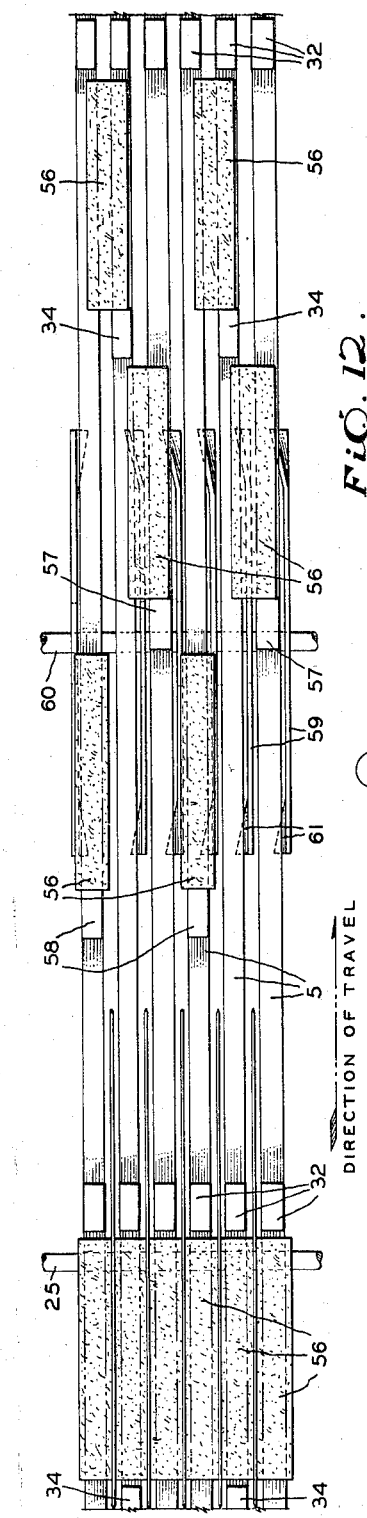
Figure 14:
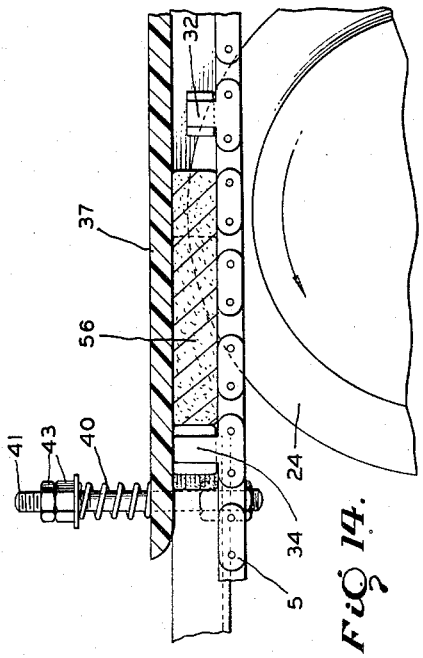
Figure 13:
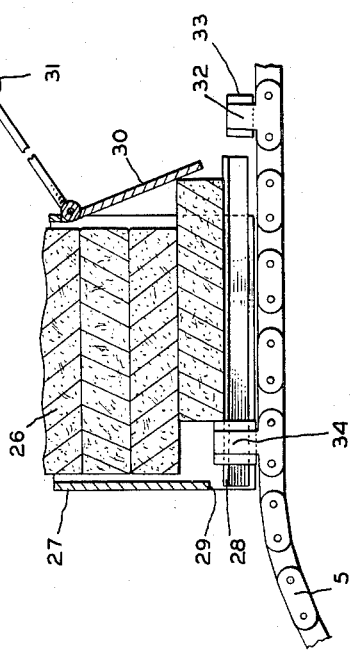

Figs. 3 and 4 are enlarged transverse sections on the lines 3—3 and 4—4 of Fig. 1;

Fig. 5 is an enlarged diagrammatic view of the first upper and first lower cutting stations, Fig. 6 being a diagrammatic section on the line 6—6 of Fig. 5;

Figs. 7 and 9 are enlarged diagrammatic views similar to Fig. 5 of successive cutting operations, Figs. 8 and 10 being sections on the lines 8—8 and 10—10 of Figs. 7 and 9 respectively;

Fig. 11 is an enlarged view showing the cross sectional shape of the cut sticks;

Fig. 12 is an enlarged diagrammatic plan showing the separation and advance of individual sticks relative to a retarded group of sticks;

Fig. 13 is an enlarged view illustrating a suitable method of feeding frozen slabs to the conveyor; and Fig. 14 is an enlarged view illustrating the preferred stick-separating and retarding means.

Figure 2:
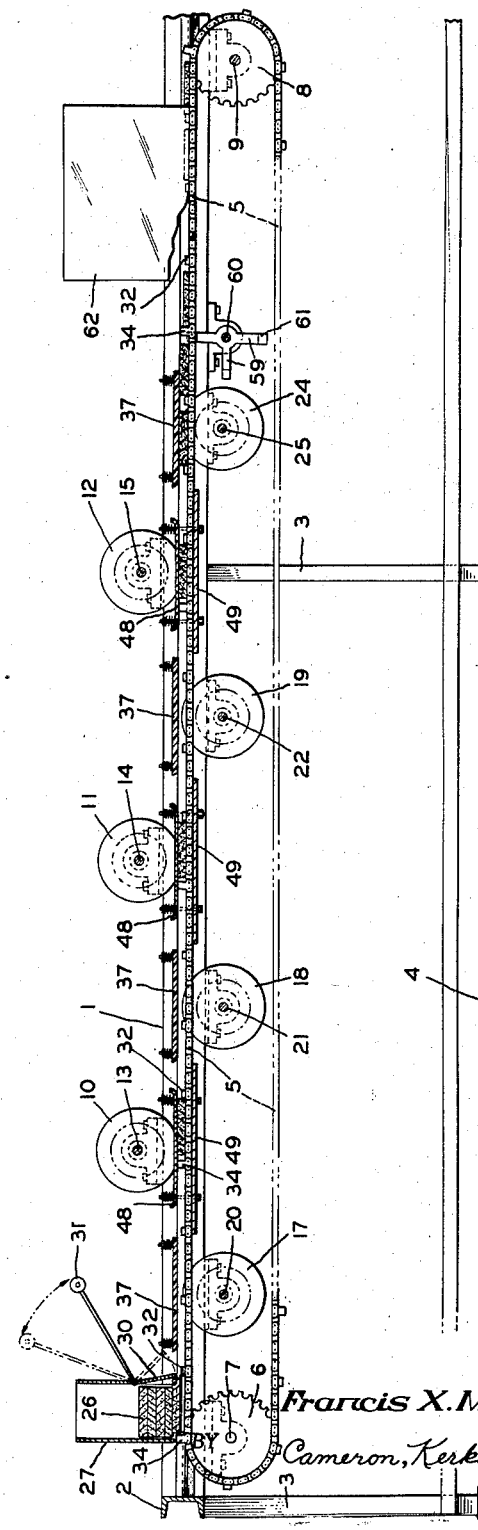
Fig. 2 is a side view of the apparatus, partly diagrammatic and partly in section.

The apparatus can be mounted in any desired manner, preferably by means of any suitable framework which in the form shown is rectangular in shape and comprises side channels 1, 1 extending the length of the machine and preferably joined at their ends by cross channels such as shown at 2. This framework can be supported in any suitable manner, Fig. 2 showing conventional standards or legs 3 secured in any suitable manner to the framework and standing on the floor or other platform 4.

Operating within the rectangular enclosure formed by the frame 1, 2 is a suitable endless conveyor that is subdivided into any desired number of parallel, synchronously-moving sections. This conveyor can conveniently take the form of a plurality of parallel chains 5 passing around sprockets 6 mounted on a common shaft 7 at one end of the machine and around similar sprockets 8 mounted on a common shaft 9 at the other end of the machine. The shafts 7 and 9 are of course mounted in suitable bearings secured to the side frame members 1, 1, the details of which have been omitted from the drawings in the interest of simplification. The chains 5 may be of any suitable type, resembling for example conventional drive chains as shown in Figs. 13 and 14. Only six chains 5 are shown in the drawings and hence it will be understood from the foregoing description that this embodiment is capable of producing only six sticks from each frozen slab, but it will be evident that the width of the frame and slab and the number of chains and other mechanisms may be increased to any desired extent.

Located at spaced points along the top of the machine are a series of cutting devices here shown as three in number and generally indicated by numerals 10, 11 and 12, these devices being mounted on shafts 13, 14 and 15 respectively that are supported in bearings on the upper surfaces of the side channels 1 as shown at 16 in Fig. 3. Located at longitudinally spaced points beneath the conveyor is a similar series of cutting devices shown as three in number and indicated generally by numerals 17, 18 and 19, these devices being mounted on shafts 20, 21 and 22 respectively that turn in suitable bearings secured to the bottoms of the side channels 1 as shown at 23 in Fig. 4. Following these cutting devices is a retarding and stick-separating device indicated generally by numeral 24 and carried by a rotating shaft 25 that is mounted in the same manner as the shafts 20, 21 and 22. It will be understood that one of the shafts 7, 9 and each of the shafts 13, 14, 15, 20, 21, 22 and 25 may be driven in any suitable manner, for example by means of a common electric motor and suitable drive chains or belts not illustrated. Preferably all six cutting devices operate at the same speed of rotation, although differences are permissible if desired. In any event all of them rotate in a direction such that their cutting edges move in the same linear direction as the conveyor, and at speeds of rotation such that the linear speed of said cutting edges is very low relative to that of the conveyor, being preferably in the range of 1–10 times that of the conveyor as stated above. The shaft 25, on the other hand, rotates in a direction opposite to that of the cutting devices in order to provide the retarding action described above.

Referring now to Fig. 13, the feed end of the machine is provided with any suitable means for feeding frozen slabs one by one to the conveyor 5. For example a stack of frozen slabs or blocks 26 is placed in a feed magazine or hopper 27, the side walls of which are provided with suitable ledges 28 to support the bottom block 26 in an elevated position above the conveyor. The rear wall of the magazine is cut away at 29 to a height somewhat above the ledges 28, and the front wall of the hopper is provided with a swinging gate 30 adapted to swing open to permit a slab 26 to be pushed out of the magazine. A suitable counterweight 31 may be provided to insure normal closing of the door 30.

Since the cutting blades will tend to accelerate the frozen slabs 26 relative to the conveyor 5, effective control of the cutting action requires that advance of the slabs relative to the conveyor be prevented by suitable stop means on the conveyor. In the present case, this stop means comprises a series or gang of upwardly projecting stop lugs 32, one on each of the chains 5. The lugs can be formed conveniently by extending the side plates of appropriate links of the chains 5 upwardly and securing filler blocks 33 between such extensions as will be clear from Fig. 13. The height of the ledges 28 is such that the gang stops 32 pass underneath the lowermost frozen slab in the hopper as shown in Fig. 13.

Secured to the chains 5 at a suitable distance behind the gang stops 32 are one or more pusher lugs 34 of height greater than that of the lugs 32 and of the ledges 28. Accordingly the pusher lug or lugs engages the lowermost frozen slab 26 and pushes it ahead out of the hopper so that it drops onto the conveyor 5 just behind the gang stops 32. The longitudinal spacing between the lugs 32 and 34 should be enough greater than the dimension of the slab to permit the foregoing action to take place, but should not be increased unduly as otherwise the capacity of the machine will be decreased unnecessarily.

From the feeding station the slab 26 moves ahead with the conveyor and the pusher lug or lugs 34 and passes through the first cutting station which, in the form shown, comprises the lower cutting device 17. This device and the other lower cutting devices 18 and 19 are preferably all of the same type, the device 19 being in Fig. 4. The shaft 22 carries a series of parallel circular rotating knife blades 35 here shown as five in number, one between each two adjacent chains 5. These blades are spaced laterally by means of spacers 36, the blades and spacers being secured on the shaft in any suitable manner to rotate as a unit therewith. The blade diameters and the location of the shaft are chosen so that the upper portions of the blades pass between the chains 5 and cut into the lower face of the block 26 as shown in Fig. 4. In order to prevent the slab from being lifted from the conveyor, it is restrained by suitable holddown means here shown as a plate 37 of any suitable material such as plastic. Secured to the inner faces of the side frame members 1 are suitable brackets 38 and 39, the top edges of brackets 39 serving as supports for the plate 37. The plate is urged in a downward direction by suitable resilient means such as, for example, one or more coil springs 40 engaging the top of the plate 37 and mounted on bolts 41 that are secured in the brackets 38, 39 by means of lock nuts 42. The compression of the springs 40 can be adjusted by means of the nuts 43 at the top of each bolt.

Having passed the first lower cutting station 17, the slab next reaches the first upper cutting station 10. The upper cutting stations 10, 11 and 12 are preferably the same, station 12 being shown in Fig. 3 by way of example. The shaft 15 carries a plurality of rotating circular knife blades 44 here shown as five in number, the blades 44 being suitably spaced by means of spacers 45 and the blades and spacers being suitably secured together and to the shaft 15 to rotate as a unit therewith. The conveyor chains 5 are preferably supported from below at the upper cutting stations in order to support the pressure of the cutting devices engaging the upper portion of the slab. Also it is desirable to provide top hold-down plates to prevent vertical displacement of the slab, these plates necessarily being slotted to allow the rotating blades to penetrate into the slab. These means may suitably take the form shown in Fig. 3 in which suitable brackets 46 and 47 are secured to the inner faces of the side channels 1, the tops of the brackets 46 serving to support an upper hold-down plate 48 and a chain support 49 being suitably secured to the brackets 47. Preferably this chain support has a series of longitudinally extending vertical ribs 50 which provide individual supporting and guiding channels for the chains 5. The hold-down plate 48 is also slotted longitudinally as shown at 51, and preferably is urged resiliently into engagement with the brackets 46 by suitable means such as the springs 52. As shown, these springs like the springs 40 are mounted on bolts 53 which are secured in the brackets 46, 47 by means of nuts 54, the same bolts and nuts serving also to mount the chain support 49. The compression of the springs 52 may be suitably adjusted by means of nuts 55.

The progressive cutting actions are illustrated diagrammatically by Figs. 5–10 inclusive. Figs. 5 and 6 show the first cuts in the bottom and in the top of the slab, in the sequence illustrated in the drawing by way of example and described above. These first cuts are formed by cutting blades having relatively short bevels and making shallow surface cuts that are relatively wide in proportion to their depth. By way of example, in a slab approximately ¾" in thickness, these first cuts may suitably be of the order of ⅛" deep. In the third and fourth cutting stations 18 and 11, the cutting action is illustrated by Figs. 7 and 8. In the case previously assumed by way of example, the third and fourth cutting stations may suitably increase the depth of the top and bottom cuts by an additional ⅛" each, leaving approximately ¼" of the central portion of the slab still uncut. This deepening of the first incisions is accomplished by blades having bevels of considerably greater radial extent than those of the first and second stations so that they can deepen the first incisions by the desired amount without widening the initial shallow grooves.

Figs. 9 and 10 show the last cutting stations 19 and 12 respectively. Here the bevels of the blades are further increased so as to permit the necessary deepening of the cuts without widening the same. In this case a slight overlap of the top and bottom cuts is desirable in order to insure complete severance of the sticks from one another. For example, the bottom cutter may penetrate to a depth of ⅜" while the top cutter may penetrate to a depth of ⁷⁄₁₆" thus affording an overlap of ¹⁄₁₆" in the case of a block of ¾" thickness.

It will be understood, of course, that the particular dimensions of the slab and depth of successive cuts given above are only for purposes of illustration and are subject to considerable variation for the given size of slab and to still further variation for other sizes. Also the number of cutting stations may be increased if desired, or in some cases it may suffice to provide only two bottom stations and two top stations. It will also be understood that the bottom and top stations may in some cases be superimposed instead of staggered, although the latter arrangement as shown in the drawings is usually preferred.

Fig. 11 shows diagrammatically the result of the cutting actions described above, in which the original slab 26 is subdivided into a plurality of separate sticks 56. As will be seen, the dimensions chosen by way of example result in sticks which are roughly rectangular in cross section, being of greater height than width.

The group of six sticks 56 into which the slab 26 is divided by the cutting stations described above passes next to a point at which the advance of the group as a whole is retarded relative to the conveyor, while at the same time one or more individual sticks of the group continue to advance with the conveyor and are thereby separated from the adjacent sticks. It is desirable to make sure that the sticks do not re-freeze together or adhere to one another enough to interfere with the advance of the individual sticks and hence the retarding action is preferably accomplished by a separating device of the type described briefly above and indicated generally at 24. The disks or blades 24 of this device (Fig. 14) each rotate between two adjacent chains 5 and between two adjacent sticks 56 of the group of sticks, the diameter of the blades preferably being at least great enough to pass between the points of closest approach of the sticks at the middle of the slab as shown in Fig. 11. As shown in Fig. 14, the blades 24 extend upwardly approximately two-thirds of the height of the sticks 56. Preferably another hold-down plate 37 of the type described above is provided.

Also the blades 24 rotate in a direction opposite to the direction of movement of the chains 5 so that the movement of the blade surfaces tends to retard the advance of the sticks relative to the conveyor. It will be evident that the rotating cutting blades previously described tend to maintain the slab against the gang of stop lugs 32. When the retarding effect of the separator blades 24 is felt by the sticks 56, however, the gang stops 32 begin to move away from the front ends of the sticks, while the pusher lug or lugs 34 approach the rear end or ends of a selected stick or sticks, as shown diagrammatically at the left-hand end of Fig. 12. It will be evident that the individual sticks can be advanced one at a time if desired, in which six pusher lugs 34 will be provided, one on each of the chains 5 and arranged in a series each at a progressively greater spacing from the gang stops 32. Also the pusher lugs 34 can be arranged to advance individual sticks in groups of two or more non-adjacent sticks such as, for example, the second and fifth sticks of the series, etc. This case is shown in Fig. 12 wherein pusher lugs 34 on the second and fifth chains are about to engage the rear ends of the second and fifth sticks substantially simultaneously and eventually to advance them to the position occupied by the corresponding sticks of the preceding series at the right-hand end of Fig. 12. Meanwhile at a suitable distance behind the lugs 34, two more similar pusher lugs 57 engage and advance two more of the retarded sticks such as the first and fourth sticks, and still later the remaining two sticks are picked up and advanced by two additional pusher lugs 58 on the third and sixth chains. Thus the six sticks move forwardly in pairs, the individual sticks being well separated which is important in cases where the sticks are to be coated since otherwise it would be very difficult to apply the coating entirely around each stick.

Given the proportions of the individual sticks such as shown in Fig. 11, it may be preferable for coating purposes to turn them through 90° so that they lie on their long sides. This may be accomplished by suitable means engaging and toppling the sticks as they move forward individually from the retarding position, each stick if necessary resting on two adjacent conveyor chains 5. As shown, this is accomplished by a plurality of rotating turn-over arms 59 mounted on a shaft 60 located just beyond the separating device 24 and rotated in any suitable manner. The ends of the arms 59 swing between the adjacent chains 5, preferably in the same direction as the chains are moving, and the tips of the arms are angled as shown at 61 so as to push the chains slightly to one side and to engage the rear ends of the sticks along one side and push them over. This result is illustrated in Fig. 12 wherein the four right-hand sticks have been turned over whereas the two sticks ahead of the lugs 58 are still upright. It will be observed that with such an arrangement, both outside arms 59 and their angled ends 61 must be arranged to tip the outside sticks over toward the center of the conveyor.

For purposes of coating, any suitable means can be employed depending upon the nature of the coating material. By way of example, fish sticks are commonly coated with a batter that is subsequently cooked by deep fat frying. This batter may conveniently be applied to the moving sticks by means of an enrobing machine of the same type as those conventionally employed for enrobing candy centers with chocolate coatings and diagrammatically indicated at 62. The details of construction and operation of such machines are known and do not form part of the present invention.

It will be understood that procedures embodying the present invention can be practiced with other types of apparatus than that described above by way of example, and further that said apparatus is susceptible of changes in the form, details of construction and arrangement of the parts without departing from the spirit of the invention. Accordingly reference should be had to the appended claims for a definition of the limits of the invention.

What is claimed is:

1. Apparatus of the class described comprising a plurality of side-by-side traveling elements forming a conveyor for a frozen slab of edible flesh, a plurality of aligned cutting elements spaced along and both above and below the conveyor and the path of travel of the slab on said conveyor, said cutting elements each comprising a plurality of cutters and the cutters of successive elements being aligned with those of the other elements in parallel planes and the cutters of successive elements being spaced to make progressively deeper cuts in both top and bottom of said moving slab so that said slab is gradually severed into side-by-side sticks, said cutting elements comprising longitudinally spaced pairs each comprising a plurality of upper cutters and a plurality of lower cutters aligned as aforesaid and comprising parallel circular knives rotating as a unit on an axis in a direction such that their edges move in the same direction as the conveyor, the linear speed of the cutting edges being between about 1–10 times that of the conveyor, said knives having beveled peripheral cutting edges and the aligned knives of successive devices having bevels of progressively increasing radial extent.

2. Apparatus of the class described comprising a traveling conveyor for a frozen slab of edible flesh, cutting devices located along the conveyor and the path of travel of the slab thereon for severing the slab into side-by-side sticks, said cutting devices moving in the same direction as but at higher speed than said conveyor, stop means on said conveyor for preventing advance of the slab relative to the conveyor while engaged by said cutting devices, a feed device for holding a stack of slabs above said conveyor with the bottom slab above the top of said stop means, pusher means on said conveyor projecting thereabove to engage said bottom slab and remove it from the stack to the conveyor, the space between said stop means and pusher means being greater than the dimension of the slab in the direction of movement, said pusher means having a width to engage the end of one stick and to pass between the cutting elements on either side thereof, and retarding means located beyond said cutting devices in the direction of movement for holding the group of side-by-side sticks against forward movement whereby said pusher means advances an individual stick ahead of the remaining retarded sticks, said retarding means comprising also a separator for the severed sticks in the form of a plurality of separating elements moving in a direction opposite to that of the conveyor in planes aligned with the cuts through the slab, each separating element passing between two adjacent sticks.

3. Apparatus of the class described comprising a traveling conveyor for a frozen slab of edible flesh, cutting devices located along the conveyor and the path of travel of the slab thereon for severing it into side-by-side sticks, said cutting devices moving in the same direction as but at a higher speed than said conveyor, stop means on said conveyor for preventing advance of the slab relative to the conveyor while engaged by said cutting devices, pusher means on said conveyor having a width to engage the end of one stick and pass between the cutting devices on either side thereof, and retarding and separating means located beyond said cutting devices in the direction of movement for separating and holding the side-by-side sticks against forward movement with the conveyor, whereby said pusher means engages and advances an individual stick with the conveyor and ahead of the remaining retarded sticks.

4. Apparatus as defined in claim 3, said retarding means comprising a plurality of separating elements movable in a direction opposite to the conveyor in planes aligned with the cuts through the slab, each separating element passing between two adjacent sticks.

5. Apparatus as defined in claim 4, said conveyor comprising a plurality of side-by-side traveling elements, said cutting devices comprising sets of rotating circular cutters above and below said conveyor and aligned with the spaces between said conveyor elements, said retarding means comprising a set of rotating separating blades aligned with the cuts in the slab made by said cutters.

6. Apparatus as defined in claim 5, in combination with a set of rotating arms located beyond said retarding means in the direction of movement and rotating between said conveying elements, each arm adapted to engage and tip over a stick that projects laterally beyond the conveyor element on which it rides.

References Cited in the file of this patent

UNITED STATES PATENTS

| | | |
|---|---|---|
| 1,248,540 | Peterson | Dec. 4, 1917 |
| 1,840,095 | Henry | Jan. 5, 1932 |
| 1,864,285 | Taylor | June 21, 1932 |
| 1,919,964 | Spang | July 25, 1933 |
| 1,975,917 | Bech | Oct. 9, 1934 |
| 2,044,835 | Criner | June 23, 1936 |
| 2,318,904 | Thompson | May 11, 1943 |
| 2,468,595 | Elmendorf | Apr. 26, 1949 |
| 2,501,224 | Kadell | Mar. 21, 1950 |
| 2,506,117 | Stiefvater | May 2, 1950 |
| 2,611,405 | Bailey | Sept. 23, 1952 |
| 2,643,952 | Crowther et al. | June 30, 1953 |

FOREIGN PATENTS

| | | |
|---|---|---|
| 214,976 | Germany | Oct. 25, 1909 |